(12) United States Patent
Balasuriya

(10) Patent No.: US 6,898,567 B2
(45) Date of Patent: May 24, 2005

(54) METHOD AND APPARATUS FOR MULTI-LEVEL DISTRIBUTED SPEECH RECOGNITION

(75) Inventor: Senaka Balasuriya, Westmont, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/034,542

(22) Filed: Dec. 29, 2001

(65) Prior Publication Data

US 2003/0139924 A1 Jul. 24, 2003

(51) Int. Cl.⁷ .......................... G10L 15/00; G10L 21/00; G10L 15/26
(52) U.S. Cl. ...................... 704/231; 704/235; 704/251; 704/255; 704/270
(58) Field of Search ............................... 704/275, 270, 704/270.1, 255, 251, 246, 244, 240, 235, 231; 379/88.03, 88.02, 88.01

(56) References Cited

U.S. PATENT DOCUMENTS

| | | | |
|---|---|---|---|
| 5,101,375 A | * 3/1992 | Goldhor | 715/531 |
| 5,365,574 A | * 11/1994 | Hunt et al. | 379/189 |
| 5,956,683 A | 9/1999 | Jacobs et al. | |
| 6,006,183 A | * 12/1999 | Lai et al. | 704/235 |
| 6,101,473 A | * 8/2000 | Scott et al. | 704/275 |
| 6,119,087 A | 9/2000 | Kuhn et al. | |
| 6,122,613 A | * 9/2000 | Baker | 704/235 |
| 6,125,345 A | * 9/2000 | Modi et al. | 704/232 |
| 6,185,535 B1 | 2/2001 | Hedin et al. | |
| 6,292,781 B1 | 9/2001 | Urs et al. | |
| 6,377,922 B2 | * 4/2002 | Brown et al. | 379/88.01 |
| 6,701,293 B2 | * 3/2004 | Bennett et al. | 704/251 |
| 2001/0036255 A1 | * 11/2001 | Reformato et al. | 379/88.01 |
| 2002/0091518 A1 | * 7/2002 | Baruch et al. | 704/231 |

OTHER PUBLICATIONS

Fiscus, "A post–processing system to yield reduced word error rates: Recognizer Output Voting Error Reduction (ROVER)", Dec. 1997, Proceeding of IEEE Workshop on Automatic Speech Recognition and Understanding, pp. 347–354.*

Maes, Stephane H., "Multi–modal Web IBM Position," W3C/WAP Workshop, IBM Human Language Technologies, pp. 1–9.

* cited by examiner

Primary Examiner—Richemond Dorvil
Assistant Examiner—V. Paul Harper
(74) Attorney, Agent, or Firm—Vedder, Price, Kaufman & Kammholz, P.C.

(57) ABSTRACT

A system and method for multi-level distributed speech recognition includes a terminal (122) having a terminal speech recognizer (136) coupled to a microphone (130). The terminal speech recognizer (136) receives an audio command (37), generating at least one terminal recognized audio command having a terminal confidence value. A network element (124) having at least one network speech recognizer (150) also receives the audio command (149), generating a at least one network recognized audio command having a network confidence value. A comparator (152) receives the recognized audio commands, comparing compares the speech recognition confidence values. The comparator (152) provides an output (162) to a dialog manager (160) of at least one recognized audio command, wherein the dialog manager then executes an operation based on the at least one recognized audio command, such as presenting the at least one recognized audio command to a user for verification or accessing a content server.

16 Claims, 4 Drawing Sheets

METHOD AND APPARATUS FOR MULTI-LEVEL DISTRIBUTED SPEECH RECOGNITION

FIELD OF THE INVENTION

The invention relates generally to communication devices and methods and more particularly to communication devices and methods employing speech recognition.

BACKGROUND OF THE INVENTION

An emerging area of technology involving terminal devices, such a handheld devices, Mobile Phone, Laptops, PDAs, Internet Appliances, desktop computers, or suitable devices, is the application of information transfer in a plurality of input and output formats. Typically resident on the terminal device is an input system allowing a user to enter information, such as specific information request. For example, a user may use the terminal device to access a weather database to obtain weather information for a specific city. Typically, the user enters a voice command asking for weather information for a specific location, such as "Weather in Chicago." Due to processing limitations associated with the terminal device, the voice command may be forwarded to a network element via a communication link, wherein the network element is one of a plurality of network elements within a network. The network element contains a speech recognition engine that recognizes the voice command and then executes and retrieves the user-requested information. Moreover, the speech recognition engine may be disposed within the network and operably coupled to the network element instead of being resident within the network element, such that the speech recognition engine may be accessed by multiple network elements.

With the advancement of wireless technology, there has been an increase in user applications for wireless devices. Many of these devices have become more interactive, providing the user the ability to enter command requests, and access information. Concurrently, with the advancement of wireless technology, there has also been an increase in the forms a user may submit a specific information request. Typically, a user can enter a command request via a keypad wherein the terminal device encodes the input and provides it to the network element. A common example of this system is a telephone banking system where a user enters an account number and personal identification number (PIN) to access account information. The terminal device or a network element, upon receiving input via the keypad, converts the input to a dual tone multi-frequency signal (DTMF) and provides the DTMF signal to the banking server.

Furthermore, a user may enter a command, such as an information request, using a voice input. Even with improvements in speech recognition technology, there are numerous processing and memory storage requirements that limit speech recognition abilities within the terminal device. Typically, a speech recognition engine includes a library of speech models with which to match input speech commands. For reliable speech recognition, often times a large library is required, thereby requiring a significant amount of memory. Moreover, as speech recognition capabilities increase, power consumption requirements also increase, thereby shorting the life span of a terminal device battery.

The terminal speech recognition engine may be an adaptive system. The speech recognition engine, while having a smaller library of recognized commands, is more adaptive and able to understand the user's distinctive speech pattern, such as tone, inflection, accent, etc. Therefore, the limited speech recognition library within the terminal is offset by a higher degree of probability of correct voice recognition. This system is typically limited to only the most common voice commands, such as programmed voice activated dialing features where a user speaks a name and the system automatically dials the associated number, previously programmed into the terminal.

Another method for voice recognition is providing a full voice command to the network element. The network speech recognition engine may provide an increase in speech recognition efficiency due to the large amount of available memory and reduced concerns regarding power consumption requirements. Although, on a network element, the speech recognition engine must be accessible by multiple users who access the multiple network elements, therefore a network speech recognition engine is limited by not being able to recognize distinctive speech patterns, such as an accent, etc. As such, network speech recognition engines may provide a larger vocabulary of voice recognized commands, but at a lower probability of proper recognition, due to inherent limitations in individual user speech patterns.

Also, recent developments provide for multi-level distributed speech recognition where a terminal device attempts to recognize a voice command, and if not recognized within the terminal, the voice command is encoded and provided to a network speech recognition engine for a second speech recognition attempt. U.S. Pat. No. 6,185,535 B1 issued to Hedin et al., discloses a system and method for voice control of a user interface to service applications. This system provides step-wise speech recognition where the at least one network speech recognition engine is only utilized if the terminal device cannot recognize the voice command. U.S. Pat. No. 6,185,535 only provides a single level of assurance that the audio command is correctly recognized, either from the terminal speech recognition engine or the network speech recognition engine.

As such, there is a need for improved communication devices that employ speech recognition engines.

BRIEF DESCRIPTION OF THE DRAWINGS

The invention will be more readily understood with reference to the following drawings contained herein.

DETAILED DESCRIPTION OF A PREFERRED EMBODIMENT OF THE INVENTION

Figure 1:
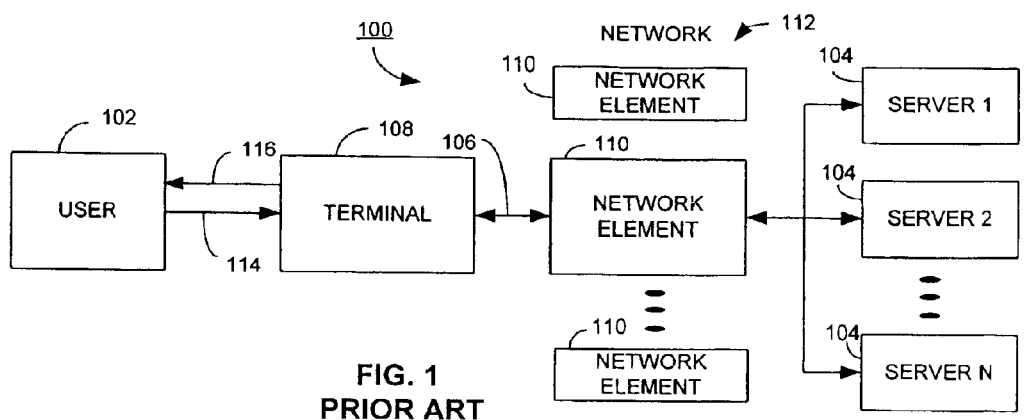
FIG. 1 illustrates a prior art wireless system.

Generally, a system and method provides for multi-level distributed speech recognition through a terminal speech recognition engine, operably coupled to a microphone within an audio subsystem of a terminal device, receiving an audio command, such as a voice command provided from a user, e.g. "Weather in Chicago," and generating at least one terminal recognized audio command, wherein the at least one terminal recognized audio commands has a corresponding terminal confidence value.

The system and method further includes a network element, within a network, having at least one network speech recognition engine operably coupled to the microphone within the terminal, receiving the audio command and generating at least one network recognized audio command, wherein the at least one network recognized audio command has a corresponding network confidence value.

Moreover, the system and method includes a comparator, a module implemented in hardware or software that compares the plurality of recognized audio commands and confidence values. The comparator is operably coupled to the terminal speech recognition engine for receiving the terminal-recognized audio commands and the terminal speech recognition confidence values, the comparator is further coupled to the network speech recognition engine for receiving the network-recognized audio commands and the network speech recognized confidence values. The comparator compares the terminal voice recognition confidence values and the network voice recognition confidence values, compiling and sorting the recognized commands by their corresponding confidence values. In one embodiment, the comparator provides a weighting factor for the confidence values based on the specific speech recognition engine, such that confidence values from a particular speech recognition engine are given greater weight than other confidence values.

Operably coupled to the comparator is a dialog manager, which may be a voice browser, an interactive voice response unit (IVR), graphical browser, JAVA®, based application, software program application, or other software/hardware applications as recognized by one skilled in the art. The dialog manager is a module implemented in either hardware or software that receives, interprets and executes a command upon the reception of the recognized audio commands. The dialog manager may provide the comparator with an N-best indicator, which indicates the number of recognized commands, having the highest confidence values, to be provided to the dialog manager. The comparator provides the dialog manager the relevant list of recognized audio commands and their confidence values, i.e. the N-best recognized audio commands and their confidence values. Moreover, if the comparator cannot provide the dialog manager any recognized audio commands, the comparator provides an error notification to the dialog manager.

When the dialog manager receives one or more recognized audio commands and the corresponding confidence values, the dialog manager may utilize additional steps to further restrict the list. For example, it may execute the audio command with the highest confidence value or present the relevant list to the user, so that the user may verify the audio command. Also, in the event the dialog manager receives an error notification or none of the recognized audio commands have a confidence value above a predetermined minimum threshold, the dialog manager provides an error message to the user.

If the audio command is a request for information from a content server, the dialog manager accesses the content server and retrieves encoded information. Operably coupled to the dialog manager is at least one content server, such as a commercially available server coupled via an internet, a local resident server via an intranet, a commercial application server such as a banking system, or any other suitable content server.

The retrieved encoded information is provided back to the dialog manager, typically encoded as mark-up language for the dialog manager to decode, such as hypertext mark-up language (HTML), wireless mark-up language (WML), extensive mark-up language (XML), Voice eXtensible Mark-up Language (VoiceXML), Extensible HyperText Markup Language (XHTML), or other such mark-up languages. Thereupon, the encoded information is decoded by the dialog manager and provided to the user.

Thereby, the audio command is distributed between at least two speech recognition engines which may be disposed on multiple levels, such as a first speech recognition engine disposed on a terminal device and the second speech recognition disposed on a network.

FIG. 1 illustrates a prior art wireless communication system 100 providing a user 102 access to at least one content server 104 via a communication link 106 between a terminal 108 and a network element 110. The network element 110 is one of a plurality of network elements 110 within a network 112. A user 102 provides an input command 114, such as a voice command, e.g. "Weather in Chicago," to the terminal 108. The terminal 108 interprets the command and provides the command to the network element 110, via the communication link 106, such as a standard wireless connection.

The network element 110 receives the command, processes the command, i.e. utilizes a voice recognizer (not shown) to recognize and interpret the input command 114, and then accesses at least one of a plurality of content servers 104 to retrieve the requested information. Once the information is retrieved, it is provided back to the network element 110. Thereupon, the requested information is provided to the terminal 108, via communication link 106, and the terminal 108 provides an output 116 to the user, such as an audible message.

In the prior art system of FIG. 1, the input command 114 may be a voice command provided to the terminal 108. The terminal 108 encodes the voice command and provides the encoded voice command to the network element 110 via communication link 106. Typically, a speech recognition engine (not shown) within the network element 110 will attempt to recognize the voice command and thereupon retrieve the requested information. As discussed above, the voice command 114 may also be interpreted within the terminal 108, whereupon the terminal then provides the network element 110 with request for the requested information.

It is also known within the industry to provide the audio command 114 to the terminal 108, whereupon the terminal 108 then attempts to interpret the command. If the terminal 108 should be unable to interpret the command 114, the audio command 114 is then provided to the network element 110, via communication link 106, to be recognized by a at least one network speech recognition engine (not shown). This prior art system provides for step-wise voice recognition system whereupon a at least one network speech recognition engine is only accessed if the terminal speech recognition engine is unable to recognize the voice command.

Figure 2:
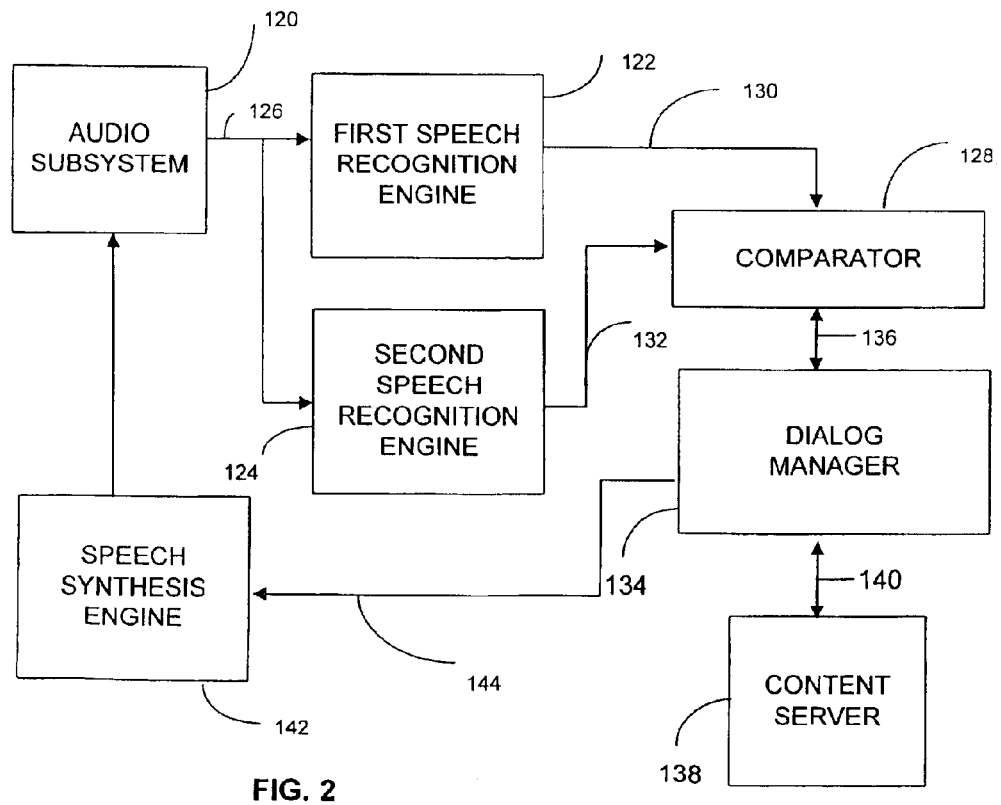
FIG. 2 illustrates a block diagram of an apparatus for multi-level distributed speech recognition in accordance with one embodiment of the present invention.

FIG. 2 illustrates an apparatus for multi-level distributed speech recognition, in accordance with one embodiment of the present invention. An audio subsystem 120 is operably coupled to both a first speech recognition engine 122 and at least one second speech recognition engine 124, such as OpenSpeech recognition engine 1.0, manufactured by SpeechWorks International, Inc. of 695 Atlantic Avenue, Boston, Mass. 02111 USA. As recognized by one skilled in the art, any other suitable speech recognition engine may be utilized herein. The audio subsystem 120 is coupled to the speech recognition engines 122 and 124 via connection 126. The first speech recognition engine 122 is operably coupled to a comparator 128 via connection 130 and the second speech recognition 124 is also operably coupled to the comparator 128 via connection 132.

The comparator 128 is coupled to a dialog manager 134 via connection 136. Dialog manager is coupled to a content server 138, via connection 140, and a speech synthesis engine 142 via connection 144. Moreover, the speech synthesis engine is further operably coupled to the audio subsystem 120 via connection 146.

Figure 3:
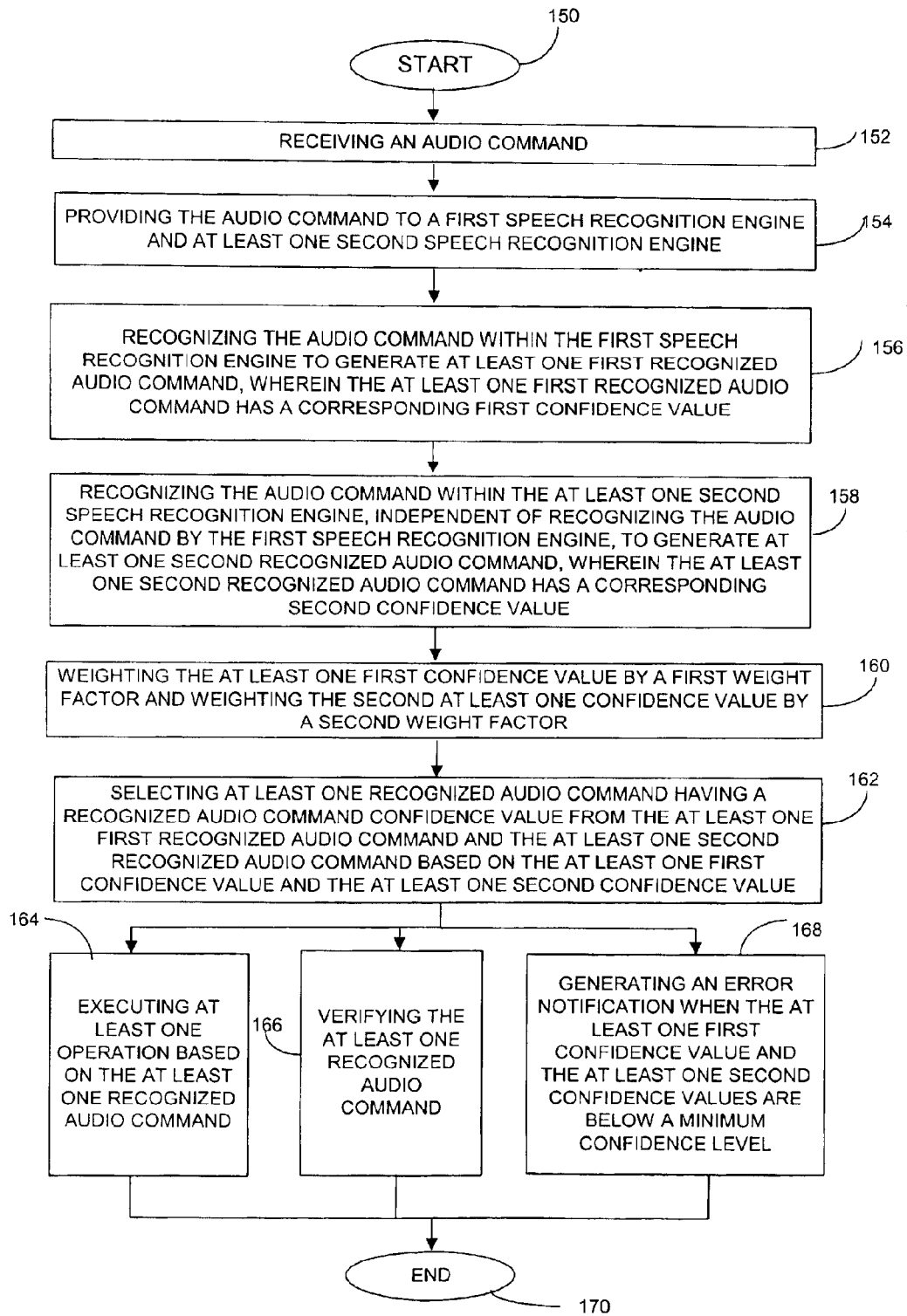
FIG. 3 illustrates a flow chart representing a method for multi-level distributed speech recognition in accordance with one embodiment of the present invention.

The operation of the apparatus of FIG. 2 is describe with reference to FIG. 3, which illustrates a method for multi-level distributed speech recognition, in accordance with one embodiment of the present invention. The method begins, designated at 150, when the apparatus receives an audio command, step 152. Typically, the audio command is provided to the audio subsystem 120. More specifically, the audio command may be provided via a microphone (not shown) disposed within the audio subsystem 120. As recognized by one skilled in the art, the audio command may be provided from any other suitable means, such as read from a memory location, provided from an application, etc.

Upon receiving the audio command, the audio subsystem provides the audio command to the first speech recognition engine 122 and the at least one second speech recognition engine 124, designated at step 154. The audio command is provided across connection 126. Next, the first speech recognition engine 122 recognizes the audio command to generate at least one first recognized audio commands, wherein the at least one first recognized audio commands has a corresponding first confidence value, designated at step 156. Also, the at least one second speech recognition engine recognizes the audio command to generate at least one second recognized audio commands, wherein the at least one second recognized audio command has a corresponding second confidence value, designated at step 158. The at least one second speech recognition engine recognizes the same audio command as the first speech recognition engine, but recognized the audio command independent of the first speech recognition engine.

The first speech recognition engine 122 then provides the at least one first recognized audio command to the comparator 128, via connection 130 and the at least one second speech recognition engine 124 provides the at least one second speech recognized audio command to the comparator 128, via connection 132. The comparator, in one embodiment of the present invention, weights the at least one first confidence value by a first weight factor and weights the at least one second confidence value by a second weight factor. For example, the comparator may give deference to the recognition of the first speech recognition engine, therefore, the first confidence values may be multiplied by a scaling factor of 0.95 and the second confidence values may be multiplied by a scaling factor of 0.90, designated at step 160.

Next, the comparator selects at least one recognized audio command, having a recognized audio command confidence value from the at least one first recognized audio command and the at least one second recognized audio commands, based on the at least one first confidence values and the at least one second confidence values, designated at step 162. In one embodiments of the present invention, the dialog manager provides the comparator with an N-best indicator, indicating the number of requested recognized commands, such as the five-best recognized commands where the N-best indicator is five.

The dialog manager 134 receives the recognized audio commands, such as the N-best recognized audio commands, from the comparator 128 via connection 136. The dialog manager then executes at least one operation based on the at least one recognized audio command, designated as step 164. For example, the dialog manager may seek to verify the at least one recognized audio commands, designated at step 166, by providing the N-best list of recognized audio commands to the user for user verification. In one embodiments of the present invention, the dialog manager 134 provides the N-best list of recognized audio commands to the speech synthesis engine 142, via connection 144. The speech synthesis engine 142 synthesizes the N-best recognized audio commands and provides them to the audio subsystem 120, via connection 146. Whereupon, the audio subsystem provides the N-best recognized list to the user.

Moreover, the dialog manager may perform further filtering operations on the N-best list, such as comparing the at least one recognized audio command confidence values versus a minimum confidence level, such as 0.65, and then simply designate the recognized audio command having the highest confidence value as the proper recognized audio command. Wherein, the dialog manager then executes that command, such as accessing a content server 138 via connection 140 to retrieve requested information, such as weather information for a particular city.

Furthermore, the comparator generates an error notification when the at least one first confidence value and the at least one second confidence value are below a minimum confidence level, designated at step 168. For example, with reference to FIG. 2, the comparator 128 may have an internal minimum confidence level, such as 0.55 with which the first confidence values and second confidence values are compared. If none of the first confidence values or the second confidence values are above the minimum confidence level, the comparator issues an error notification to the dialog manager 134, via connection 176.

Moreover, the dialog manager may issue an error notification in the event the recognized audio commands, such as within the N-best recognized audio commands, fail to contain a recognized confidence value above a dialog manager minimum confidence level. An error notification is also generated by the comparator when the first speech recognition engine and the at least one second speech recognition engine fail to recognize any audio commands, or wherein the recognized audio commands are below a minimum confidence level designated by the first speech recognition engine, the second speech recognition engine, or the comparator.

When an error notification is issued, either through the comparator 128 or the dialog manager 134, the dialog manager then executes an error command wherein the error command is provided to the speech synthesis engine 142, via connection 144 and further provided to the end user via the audio subsystem 120, via connection 146. As recognized by one skilled in the art, the error command may be provided to the user through any other suitable means, such as using a visual display.

Thereupon, the apparatus of FIG. 2 provides for multi-level distributed speech recognition. Once the dialog manager executes an operation in response to the at least one recognized command, the method is complete, designated at step 170.

Figure 4:
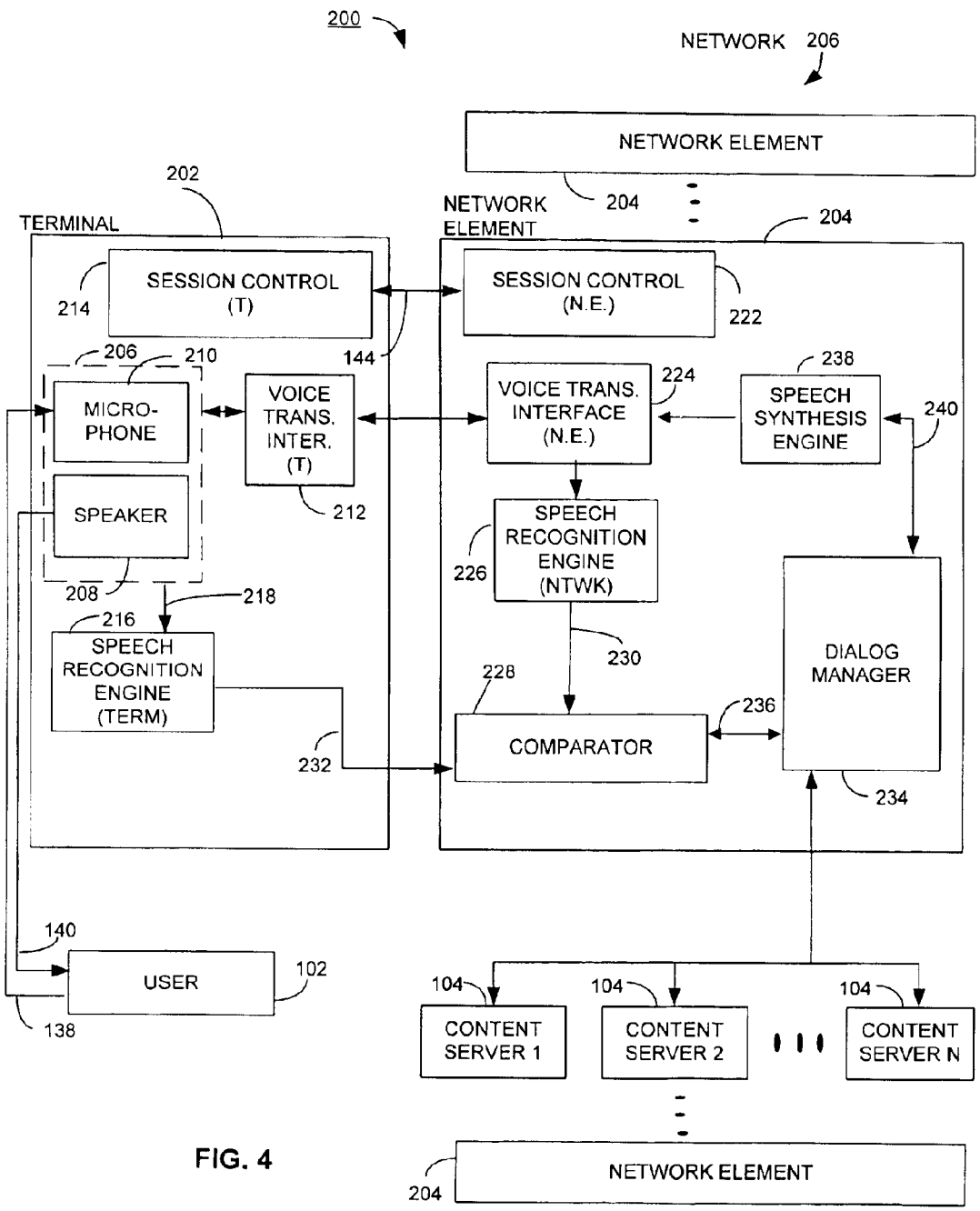
FIG. 4 illustrates a block diagram of a system for multi-level distributed speech recognition in accordance with one embodiment of the present invention.

FIG. 4 illustrates a multi-level distributed speech recognition system, in accordance with one embodiment to the present invention. The system 200 contains of a terminal 202 and a network element 204. As recognized by one skilled in the art, the network element 204 is one of a plurality of network elements 204 within a network 206.

The terminal 202 has an audio subsystem 206 that contains, among other things, a speaker 208 and a microphone 210. The audio subsystem 206 is operably coupled to a terminal voice transfer interface 212. Moreover, a terminal session control 214 is disposed within the terminal 202.

The terminal 202 also has a terminal speech recognition engine 216, such as found in the Motorola i90 c™ which provides voice activated dialing, manufactured by Motorola, Inc. of 1301 East Algonquin Road, Schaumburg, Ill., 60196 USA, operably coupled to the audio subsystem 206 via connection 218. As recognized by one skilled in the art, other suitable speech recognition engines may be utilized herein. The terminal speech recognition engine 216 receives an audio command 220 originally provided from a user 222, via the microphone 210 within the audio subsystem 206.

The terminal session control 214 is operably coupled to a network element session control 222 disposed within the network element 204. As recognized by one skilled in the art, the terminal session control 214 and the network element session control 222 communicate upon the initialization of a communication session, for the duration of the session, and upon the termination of the communication session. For example, providing address designations during an initialization start-up for various elements disposed within the terminal 202 and also the network element 204.

The terminal voice transfer interface 212 is operably coupled to a network element voice transfer interface 224, disposed in the network element 204. The network element voice transfer interface 224 is further operably coupled to at least one network speech recognition engine 226, such as OpenSpeech recognition engine 1.0, manufactured by SpeechWorks International, Inc. of 695 Atlantic Avenue, Boston, Mass. 02111 USA. As recognized by one skilled in the art, any other suitable speech recognition engine may be utilized herein. The at least one network speech recognition engine 226 is further coupled to a comparator 228 via connection 230, the comparator may be implemented in either hardware or software for, among other things, selecting at least one recognized audio command from the recognized audio commands received from the terminal speech recognition engine 216 and the network speech recognition engine 226.

The comparator 228 is further coupled to the terminal speech recognition engine 216 disposed within the terminal 202, via connection 232. The comparator 228 is coupled to a dialog manager 234, via connection 236. Dialog manager 234 is operably coupled to a plurality of modules, coupled to a speech synthesis engine 238, via connection 240, and coupled to at least one content server 104. As recognized by one skilled in the art, dialog manager may be coupled to a plurality of other components, which have been omitted from FIG. 4 for clarity purposes only.

Figure 5:
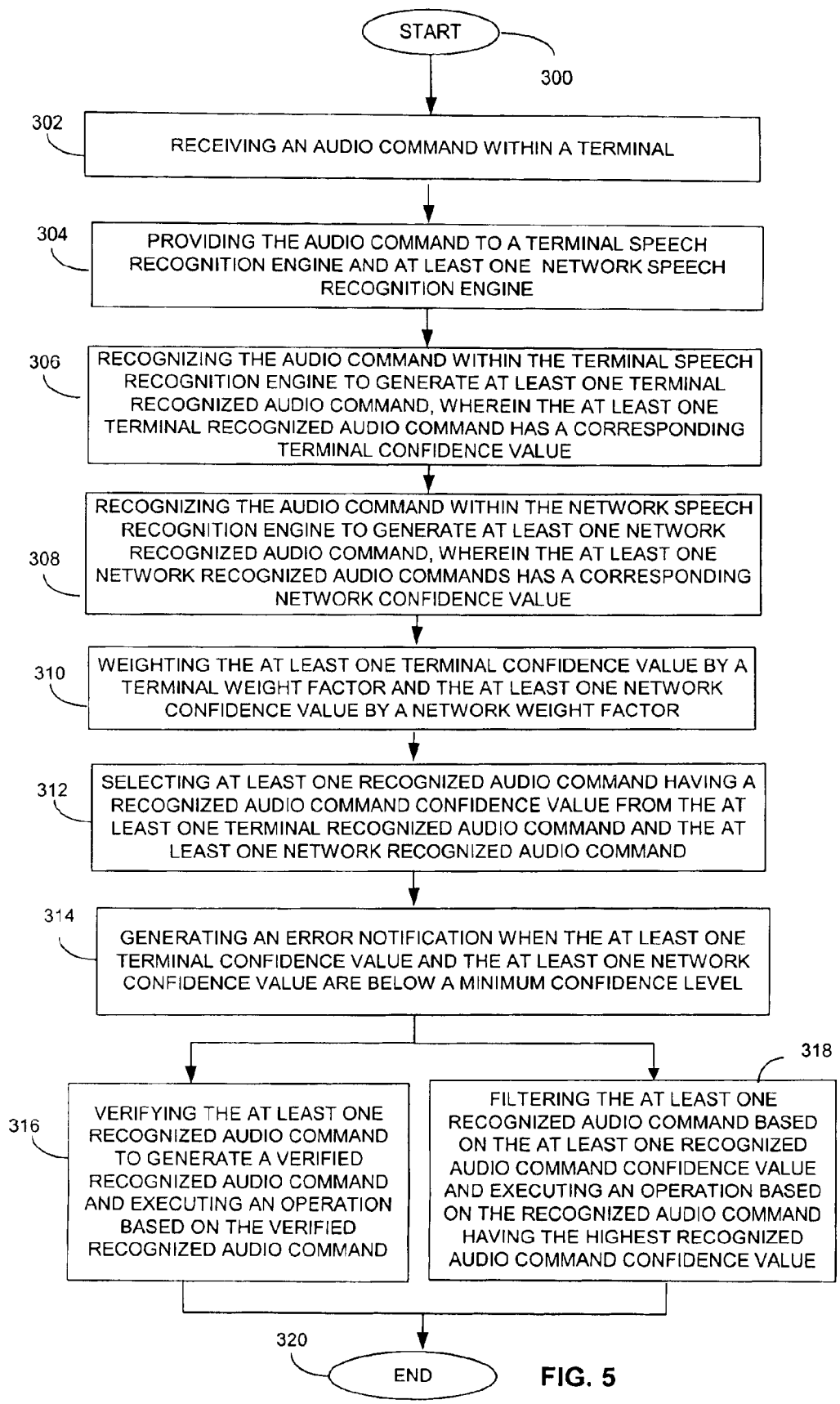
FIG. 5 illustrates a flow chart representing a method for multi-level distributed speech recognition in accordance with one embodiment of the present invention.

FIG. 5 illustrates a method for multi-level distributed speech recognition, in accordance with an embodiment of the present invention. As noted with reference to FIG. 4, the method of FIG. 5 begins, step 300, when audio command is received within the terminal 202. Typically, the audio command is provided to the terminal 202 from a user 102 providing an audio input to the microphone 210 of the audio subsystem 206. The audio input is encoded in standard encoding format and provided to the terminal voice recognition engine 216 and further provided to the at least one network speech recognition engine 226, via the terminal voice transfer interface 212 and the at least one network element voice transfer interface 224, designated at step 304.

Similar to the apparatus of FIG. 2, the terminal speech recognition engine recognizes the audio command to generate at least one terminal recognized audio command, wherein the at least one terminal recognized audio command has a corresponding terminal confidence value, designated step 306. Moreover, the at least one network speech recognition engine 226 recognizes the audio command to generate at least one network recognized audio command, wherein the at least one network recognized audio command has a corresponding network confidence value, designated at step 308. The at least one network speech recognition engine 226 recognizes the same audio command as the terminal speech recognition, but also recognizes the audio command independent of the terminal speech recognition engine.

Once the audio command has been recognized by the terminal speech recognition engine 216, the at least one terminal recognized audio command is provided to the comparator 228, via connection 232. Also, once the at least one network speech recognition engine 226 has recognized the audio command, the at least one network recognized audio command is provided to the comparator 228, via connection 230.

In one embodiment of the present invention, the comparator 228 weights the at least one terminal confidence values by a terminal weight factor and weights the at least one network confidence value by a network weight factor, designated at step 310. For example, the comparator may grant deference to the recognition capability of the at least one network speech recognition engine 226 and therefore adjust, i.e. multiply, the network confidence values by a scaling factor to increase the network confidence values and also adjust, i.e. multiply, the terminal confidence values by a scaling factor to reduce the terminal confidence values.

Moreover, the method provides for selecting at least one recognized audio command having a recognized audio command confidence value from the at least one terminal recognized audio command and the at least one network recognized audio command, designated at step 312. Specifically, the comparator 228 selects a plurality of recognized audio commands based on the recognized audio command confidence value. In one embodiment of the present invention, the dialog manager 234 provides the comparator 228 with an N-best indicator, indicating the number N of recognized audio commands to provide to the dialog manager 234. The comparator 228 sorts the at least one terminal recognized audio command and at least one network recognized audio command by their corresponding confidence values and extracts the top N-best commands therefrom.

In one embodiment of the present invention, the comparator 228 may filter the at least one terminal recognized audio command and at least one network recognized audio command based on the recognized audio command corresponding confidence values. For example, the comparator may have a minimum confidence value with which the recognized audio command confidence values are compared and all recognized audio commands having a confidence value below the minimum confidence level are eliminated. Thereupon, the comparator provides the dialog manager with the N-best commands.

Moreover, the comparator may provide the dialog manager with fewer than N commands in the event that there are less than N commands having a confidence value above the minimum confidence level. In the event the comparator fails to receive any recognized commands having a confidence value above the minimum confidence level, the comparator generates an error notification and this error notification is provided to the dialog manager via connection 236. Furthermore, an error notification is generated when the at least one terminal confidence value and the at least one network confidence value are below a minimum confidence level, such as a confidence level below 0.5., designated at step 314.

In one embodiment of the present invention, the dialog manager may verify the at least one recognized audio command to generate a verified recognized audio command and execute an operation based on the verified recognized audio command, designated at step 316. For example, the dialog manager may provide the list of N-best recognized audio commands to the user through the speaker 208, via the voice transfer interfaces 212 and 214 and the speech synthesis engine 238. Whereupon, the user may then select which of the N-best commands accurately reflects the original audio command, generating a verified recognized audio command.

This verified recognized audio command is then provided back to the dialog manager 234 in the same manner the original audio command was provided. For example, should the fourth recognized audio command of the N-best list be the proper command, and the user verifies this command, generating a verified recognized audio command, the user may then speak the word 4 into the microphone 206 which is provided to both the terminal speech recognition engine 216 and the at least one network speech recognition engine 226 and further provided to the comparator 228 where it is thereupon provided to the dialog manager 234. The dialog manager 234, upon receiving the verified recognized audio command executes an operation based on this verified recognized audio command.

The dialog manager 234 may execute a plurality of operations based on the at least one recognized audio command, or the verified audio command. For example, the dialog manager may access a content server 104, such as a commercial database, to retrieve requested information. Moreover, the dialog manager may execute an operation within a program, such as going to the next step of a preprogrammed application. Also, the dialog manager may fill-in the recognized audio command into a form and thereupon request from the user a next entry or input for the form. As recognized by one skilled in the art, the dialog manager may perform any suitable operation as directed to or upon the reception of the at least one recognized audio command.

In one embodiment of the present invention, the dialog manager may, upon receiving the at least one recognized audio command, filter the at least one recognized command based on the at least one recognized audio command confidence value and execute an operation based on the recognized audio command having the highest recognized audio command confidence value, designated at step 318. For example, the dialog manager may eliminate all recognized audio commands having a confidence value below a predetermined setting, such as below 0.6, and then execute an operation based on the remaining recognized audio commands. As noted above, the dialog manager may execute any suitable executable operation in response to the at least one recognized audio command.

Moreover, the dialog manager may, based on the filtering, seek to eliminate any recognized audio command having a confidence value below a predetermined confidence level, similar to the operation performed of the comparator 236. For example, the dialog manager may set a higher minimum confidence value than the comparator, as this minimum confidence level may be set by the dialog manager 234 independent of the rest of the system 200. In the event the dialog manager should, after filtering, fail to contain any recognized audio commands above the dialog manager minimum confidence level, the dialog manager 234 thereupon generates an error notification, similar to the comparator 228.

Once the error notification has been generated, the dialog manager executes an error command 234 to notify the user 102 that the audio command was not properly received. As recognized by one skilled in the art, the dialog manager may simply execute the error command instead of generating the error notification as performed by the comparator 228.

Once the dialog manager has fully executed the operation, the method for multi-level distributed recognition has been completed, designated at step 320.

The present invention is directed to multi-level distributed speech recognition through a first speech recognition engine and at least one second speech recognition engine. In one embodiment of the present invention, the first speech recognition is disposed within a terminal and the at least one second speech recognition engine is disposed within a network. As recognized by one skilled in the art, the speech recognition engines may be disposed within the terminal, network element, in a separate server on the network being operably coupled to the network element, etc, wherein the speech recognition engines receive the audio command and provide at least one recognized audio command to be compared and provided to a dialog manager. Moreover, the present invention improves over the prior art by providing the audio command to the second speech recognition engine, independent of the same command being provided to the first speech recognition engine. Therefore, irrespective of the recognition capabilities of the first speech recognition engine, the same audio command is further provide to the second speech recognition. As such, the present invention improves the reliability of speech recognition through the utilization of multiple speech recognition engines in conjunction with a comparator and dialog manager that receive and further refine the accuracy of the speech recognition capabilities of the system and method.

It should be understood that the implementations of other variations and modifications of the invention and its various aspects as may be readily apparent to those of ordinary skill in the art, and that the invention is not limited by the specific embodiments described herein. For example, comparator and dialog manager of FIG. 4 may be disposed on a server coupled to the network element instead of being resident within the network element. It is therefore contemplated to cover by the present invention, any and all modifications, variations, or equivalents that fall within the spirit and scope of the basic underlying principles disclosed and claimed herein.

What is claimed is:

1. A method for multi-level distributed speech recognition between a terminal device and a network device comprising:

providing an audio command to a first speech recognition engine in the terminal device wirelessly providing the audio command to at least one second speech recognition engine in the network device;

recognizing the audio command within the first speech recognition engine to generate at least one first recognized audio command, wherein the at least one first recognized audio command has a corresponding first confidence value;

recognizing the audio command within the at least one second speech recognition engine, independent of recognizing the audio command by the first speech recognition engine, to generate at least one second recognized audio command, wherein the at least one second recognized audio command has a corresponding second confidence value;

wirelessly transmitting the at least one first recognized audio command to a comparator;

transmitting the at least one second recognized audio command to the comparator; and selecting at least one recognized audio command having a recognized audio command confidence value from the at least one first recognized audio command and the at least one second recognized audio command based on the at least one first confidence value and the at least one second confidence value.

2. The method of claim 1 further comprising:
accessing an external content server in response to the at least one recognized audio command to retrieve encoded information therefrom.

3. The method of claim 2 further comprising:
receiving the encoded information from the content server; and
decoding the encoded information.

4. The method of claim 3 further comprising:
prior to selecting at least one recognized audio command, weighting the at least one first confidence value by a first weight factor and weighting the at least one second confidence values by a second weight factor.

5. The method of claim 3 further comprising:
prior to accessing the content server, executing at least one operation based on the at least one recognized audio command.

6. The method of claim 5 further comprising:
verifying The at least one recognized audio command.

7. The method of claim 1 further comprising:
generating an error notification when the at least one first confidence value and the at least one second confidence values are below a minimum confidence level.

8. A method for multi-level distributed speech recognition comprising:
providing an audio command to a terminal speech recognition engine;
wirelessly providing the audio command to at least one network speech recognition engine;
recognizing the audio command within the terminal speech recognition engine to generate at least one terminal recognized audio command, wherein the at least one terminal recognized audio command has a corresponding terminal confidence value;
recognizing the audio command within the at least one network speech recognition engine to generate at least one network recognized audio command, wherein the at least one network recognized audio command has a corresponding network confidence value;
wirelessly transmitting the at least one terminal recognized audio command to a comparator;
transmitting the at least one network recognized audio command to the comparator; and
selecting at least one recognized audio command having a recognized audio command confidence value from the at least one terminal recognized audio command and the at least one network recognized audio command;
inserting the at least one recognized audio command within a form; and
accessing an external content server in response to the at least one recognized audio command to retrieve encoded information therefrom.

9. The method of claim 8 further comprising:
prior to accessing a content server, generating an error notification when the at least one terminal confidence value and the at least one network confidence value are below a minimum confidence level.

10. The method of claim 8 further comprising:
prior to selecting the at least one recognized audio command, weighting the at least one terminal confidence value by a terminal weight factor and the at least one network confidence value by a network weight factor.

11. The method of claim 8 further comprising:
filtering the at least one recognized audio command based on the at least one recognized audio command confidence value; and
executing an operation based on the recognized audio command having the highest recognized audio command confidence value.

12. The method of claim 8 further comprising:
verifying the at least one recognized audio command to generate a verified recognized audio command; and
executing an operation based on the verified recognized audio command.

13. A system for multi-level distributed speech recognition between a terminal device and a network device comprising:
a terminal speech recognition engine operably coupled to a microphone and coupled to receive an audio command and generate at least one terminal recognized audio command, wherein the at least one terminal recognized audio command has a corresponding terminal confidence value;
at least one network speech recognition engine operably coupled to the microphone and coupled to receive the audio command across a wireless transmission from the terminal device to the network device and generate at least one network recognized audio command, independent of the terminal speech recognition engine, wherein the at least one network recognized audio command has a corresponding network confidence value;
a comparator disposed on the terminal device, operably coupled to the terminal speech recognition engine operative to receive the at least one terminal recognized audio command from a wireless transmission and further operably coupled to the at least one network speech recognition engine operably coupled to receive the at least one network recognized audio command; and
a dialog manager operably coupled to the comparator, wherein the comparator selects at least one recognized audio command having a recognized confidence value from the at least one terminal recognized audio command and the at least one network recognized audio command based on the at least one terminal confidence value and the at least one network confidence value, wherein the selected at least one recognized audio command is provided to the dialog manager.

14. The system of claim 13 further comprising:
a dialog manager audio command determined by the dialog manager from the at least one recognized audio commands based on the at least one recognized audio command confidence levels such that the dialog manager inserts the dialog manager command within a form; and
the dialog manager being operably coupleable to an external content server such that the operation executed by the dialog manager includes accessing the external content server to retrieve encoded information therefrom.

15. The system of claim 14 further comprising:
wherein the dialog manager retrieves the encoded information from the content server in response to the dialog manager audio command.

16. The system of claim 15 further comprising:
a speech synthesis engine operably coupled to the dialog manager, wherein the speech synthesis engine receives speech encoded information from the dialog manager and generates speech formatted information; and
a speaker operably coupled to the speech synthesis engine, wherein the speaker receives the speech formatted information and provides an output message.

\* \* \* \* \*